United States Patent [19]

Motter et al.

[11] 3,855,458
[45] Dec. 17, 1974

[54] FLOW METER

[75] Inventors: James W. Motter; Connie A. Allen, both of Huntsville, Ala.

[73] Assignee: Toroid Corporation, Huntsville, Ala.

[22] Filed: Aug. 21, 1973

[21] Appl. No.: 390,201

[52] U.S. Cl. ............... 235/151.34, 137/403, 222/55
[51] Int. Cl. ........................... G01g 17/04, G06j 3/00
[58] Field of Search .......... 235/151.34; 222/58, 59, 222/77, 55; 177/68, 118, 105; 73/194 R, 194 M, 223; 137/403

[56] References Cited
UNITED STATES PATENTS

| | | | |
|---|---|---|---|
| 3,099,368 | 7/1963 | Turner et al. | 222/58 |
| 3,303,967 | 2/1967 | Munson | 222/55 X |
| 3,329,311 | 7/1967 | Goff et al. | 222/58 X |
| 3,481,509 | 12/1969 | Marhauer | 222/58 X |
| 3,532,253 | 10/1970 | Godwin | 222/58 |
| 3,692,048 | 9/1972 | Uchida et al. | 137/403 |
| 3,724,720 | 4/1973 | Bullivant | 222/55 |
| 3,749,285 | 7/1973 | Latham, Jr. | 222/58 |

Primary Examiner—Malcolm A. Morrison
Assistant Examiner—Edward J. Wise

[57] ABSTRACT

A flow measurement system wherein a supply tank containing a stored material is continuously weighed as material is drawn from it. Weight indications at a selected time rate are obtained, with each two successive indications subtracted and therefrom flow rate determined.

8 Claims, 4 Drawing Figures

FLOW METER

BACKGROUND OF THE INVENTION

This invention relates to flow measurement systems and particularly to an improved system wherein flow is determined through periodic weight measurements.

GENERAL DESCRIPTION OF THE PRIOR ART

The rate of flow of liquid materials has typically been accomplished by pressure sensing devices in a fluid line containing constrictions which produce variations in pressure dependent upon flow. Such type systems, while adequate for many purposes, often lack sufficient accuracy for very precise flow measurement systems. Applicants are unaware of devices specifically capable of rate of flow measurement of non-liquids with a high degree of accuracy.

SUMMARY OF THE INVENTION

Accordingly, it is the object of this invention to provide an improved flow measurement and control system in which accuracy can be substantially improved. In accordance with this invention, a supply container or bin from which material is being drawn is supported by a weight measuring transducer. outputs of the transducer are registered at a selected time rate, for example, once per second. A measurement occurring at one time is subtracted from a measurement occurring in this example one second earlier. The flow occurring in that one second is so determined, and thus a flow rate in some weight unit per second.

DETAILED DESCRIPTION OF THE DRAWINGS

Figure 1:
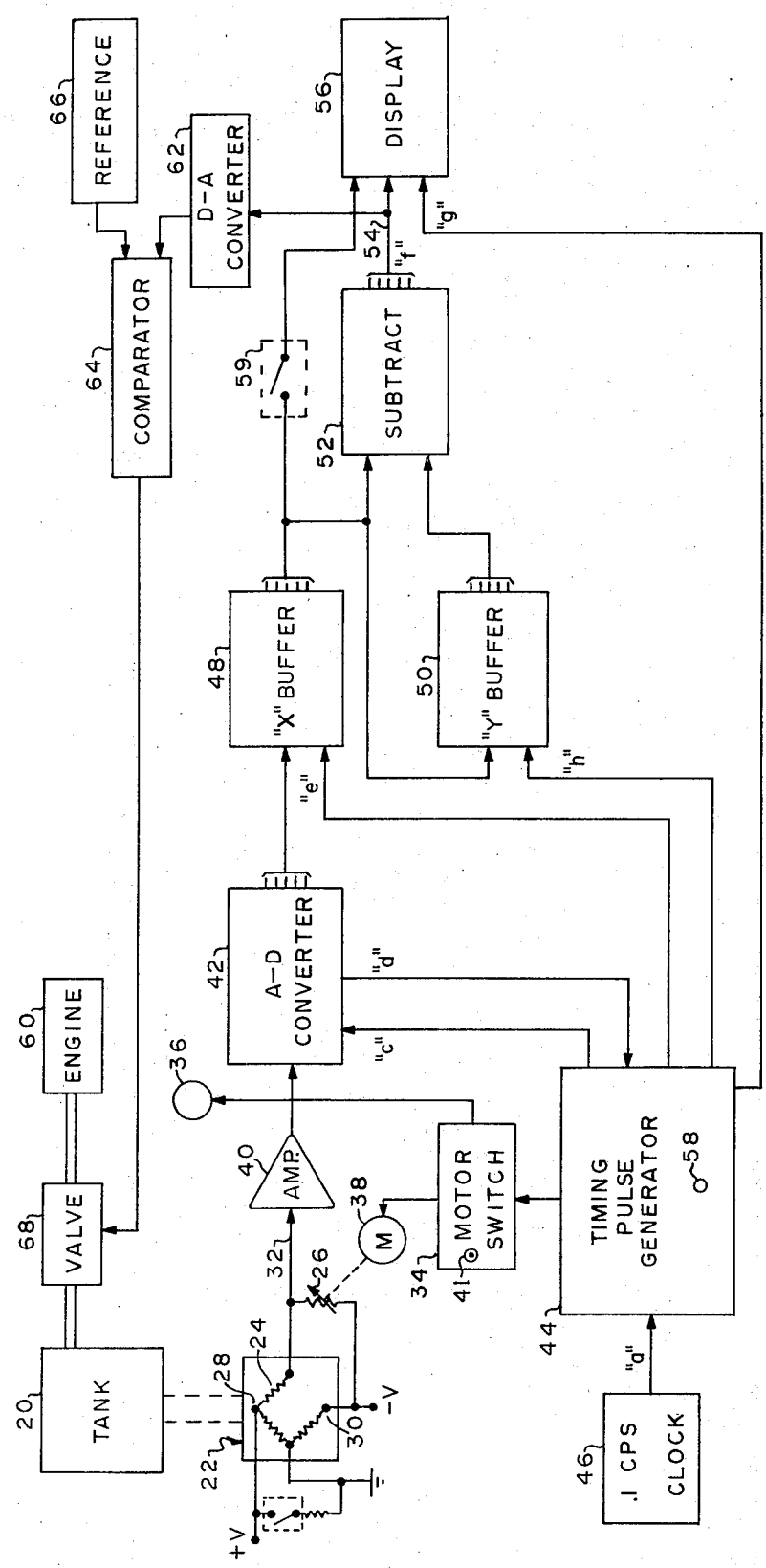
FIG. 1 is an electrical schematic diagram of an embodiment of the invention.

Referring to FIG. 1, a tank 20 from which it is desired to measure output flow is continuously weighed by an electrical transducer such as load cell assembly 22. Load cell assembly 22 typically contains one or more strain sensitive resistors 24 and some form of adjustment or balancing device, connected in a bridge circuit across which terminals 28 and 30 is applied a potential. As shown, an output of load cell assembly 22 is obtained between ground and lead 32. A control circuit 34 having a reference or zero indicating lamp 36 controls servo motor 38 to zero balance load cell 22 at any desired output of load cell assembly 22. Control circuit 34, when operated, sees an amplified weight output of load cell assembly 22 from amplifier 40 to which is connected and output of load cell assembly 22. It contains a conventional control switch 41 and feedback circuitry to drive motor 38 in a direction to provide a zero voltage output of load cell assembly 22 when switch 41 is operated.

Figure 2:
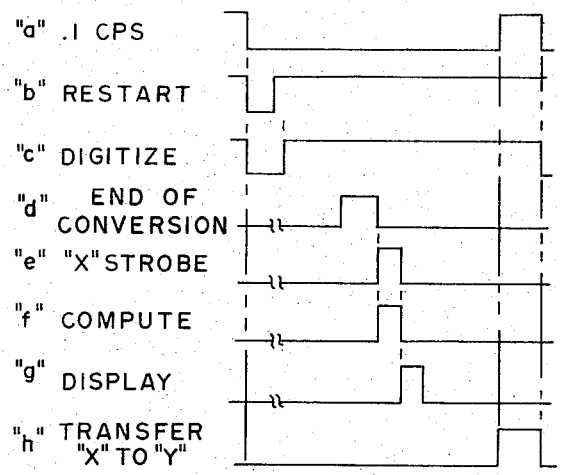
FIG. 2 consists of a series of waveforms illustrative of the operation of the invention as shown in FIG. 1.

An analog-to-digital converter 42 is fed analog weight signals from amplifier 40. Pulse generator 44 basically controlled by a 0.1 cycle per second clock 46. Timing pulse generator 44 generally provides the time pulses shown in FIG. 2 to control the operation of the system as will be described.

A-D converter 42 is adapted to provide a five-digit decimal output which is supplied "X" buffer 48 in response to waveform e which occurs at the end of the conversion of each complete number in A-D converter 42. "Y" buffer 50 is fed the decimal number in "X" buffer 48 in response to a strobe pulse shown in waveform h. Subtractor 52 is a conventional decimal subtractor which continuously provides an output on lead 54 representative of the difference of the numbers fed it from "X" and "Y" buffers 48 and 50. Decimal display 56 is triggered after each subtraction by a pulse shown in waveform g. Start switch 58 of timing pulse generator 44 provides, when operated, a restart pulse as shown in waveform b. Coincident with the trailing edge of the start pulse shown in waveform b, a digitized instruction as shown in waveform c is fed from timing pulse generator 44 to A-D converter 42. This results in the digitizing of an input to A-D converter 42, and at the end of the conversion the converter returns an end of conversion signal as shown in waveform d to timing pulse generator 44.

Where desired, the system may be employed to actually regulate the flow of material, say for example fuel flow to an engine 60. In such case, for example, a rate output of subtractor 52 is fed to D-A converter 62 and the resulting analog rate output applied to one input of comparator 64. A second input is applied to comparator 64 from reference 66, representative of a desired rate of flow. This reference may be a fixed, adjustable or programmed reference input. The output of comparator 64, representing the error between actual rate and desired rate is fed to an electrical control valve 68 which increases or decreases the flow as required to cause the actual rate to conform to the desired or referenced rate.

Figure 3:
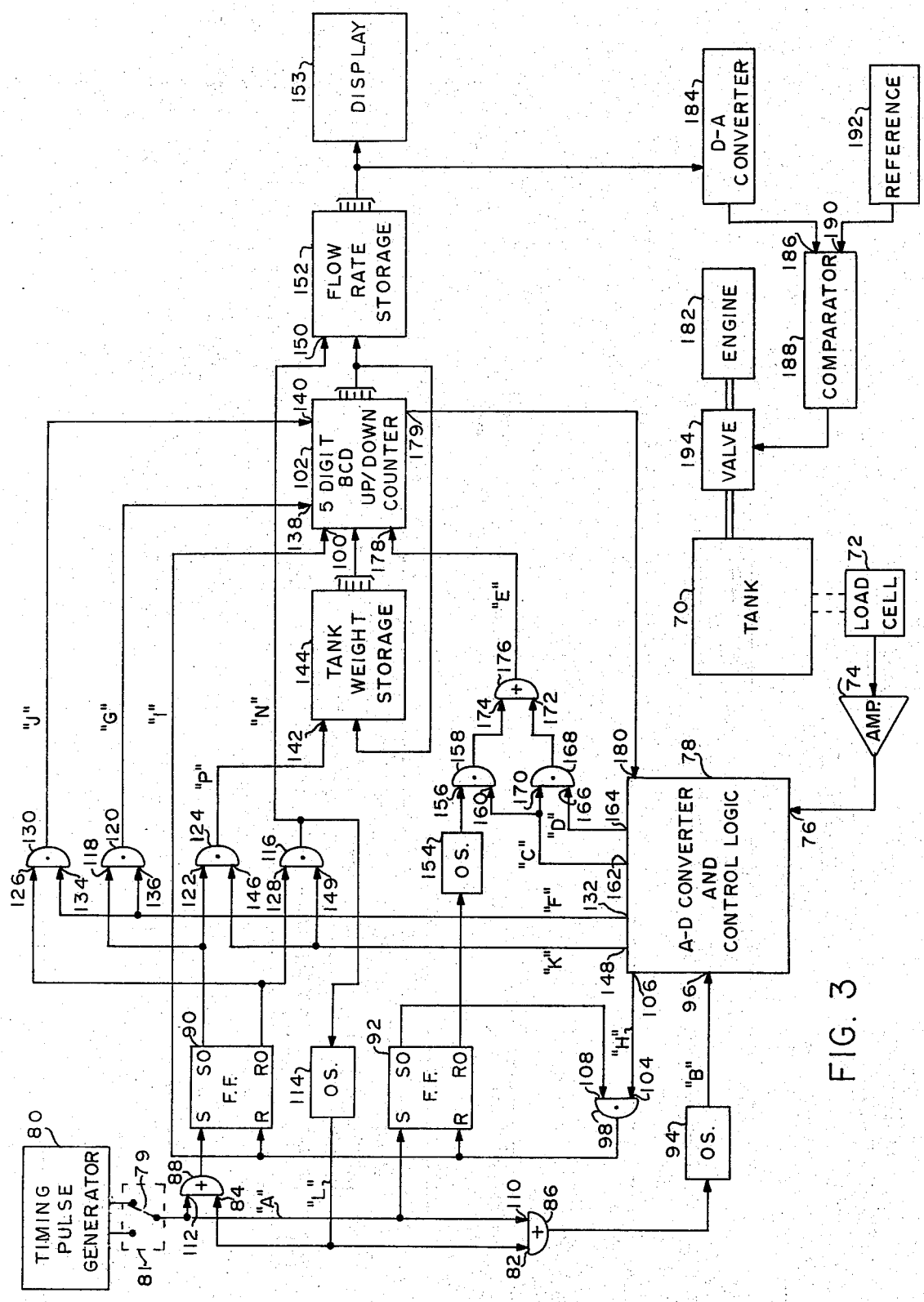
FIG. 3 is an electrical schematic diagram of an alternate embodiment of the invention.

An alternate approach to rate determination would be to employ an up/down counter to perform computation of flow rate. Tank weight data from A-D converter would be fed in bit serial form to an up/cown counter, not shown, from which it would be transferred in parallel into the "X" buffer. At the next sampling, interval serial data from the A-D converter would then be used to count down from the previous weight and thus subtract the lesser weight of the subsequent measurement. Still another embodiment of this invention is shown in FIG. 3 with coordinate control pulses shown in FIG. 4. It, too, employs an up/down counter.

Figure 4:
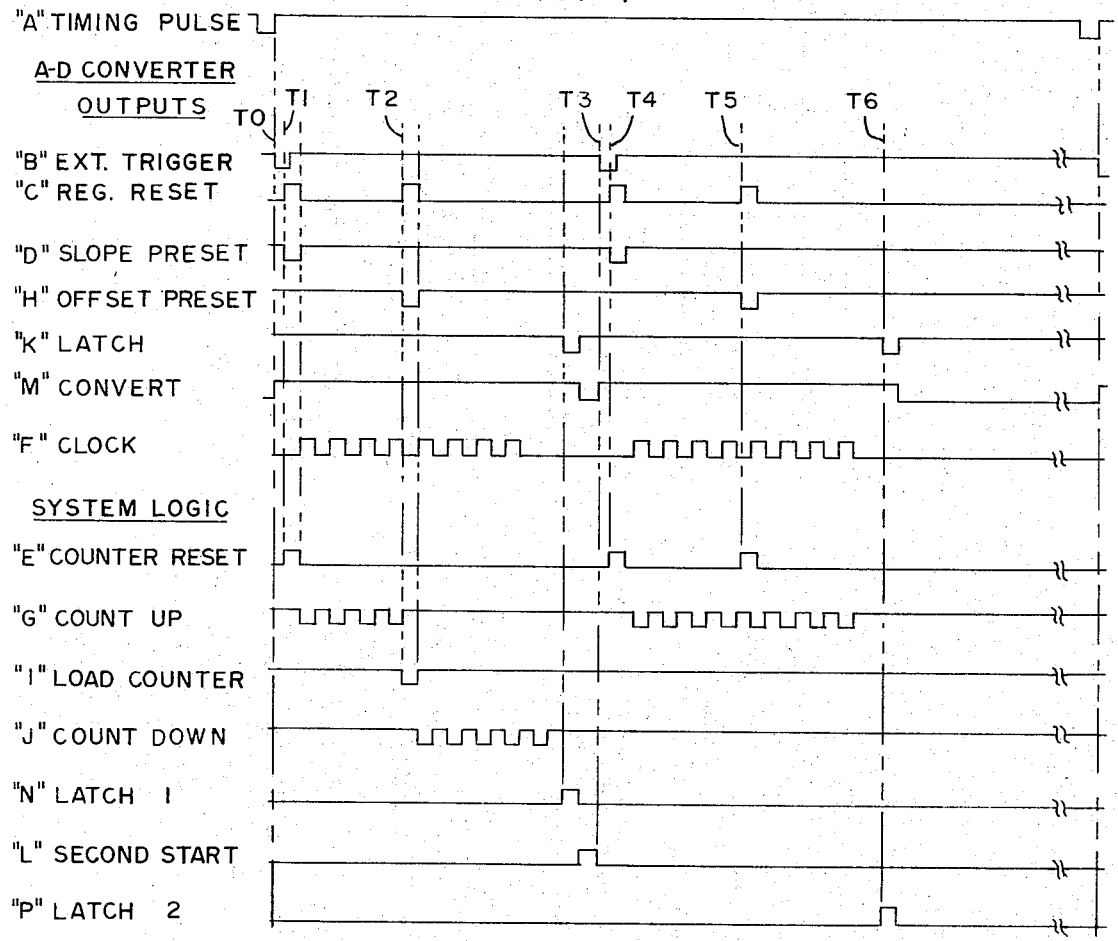
FIG. 4 consists of a series of waveforms illustrative of the operation of the invention as shown in FIG. 3.

Referring now to FIGS. 3 and 4, a tank 70 from which it is desired to measure output flow is supported by load cell assembly 72. The output of load cell 72 is coupled through amplifier 74 to the analog input 76 of A-D converter 78. The output of load cell 72 is selectively sampled at intervals of 36 seconds or 6 minutes as determined by timing pulse generator 80. Output pulses of generator 80, occurring at intervals of 36 seconds or 6 minutes, are selectively coupled through movable arm 79 of switch 81 to inputs 110 and 112 of "or" gates 86 and 88, respectively, and to the set input S of flip flops 90 and 92, respectively. The output of "or" gate 86 triggers one shot 94 and a delayed output of one shot 94 is coupled to the external trigger input 96 of A-D converter 78. The output of 37 or" gate 88 is coupled to the set input S of flip flop 92. Thus, upon the occurrence of each clock pulse of timing pulse generator 80, a "start" digitized signal is coupled to A-D converter 78, and flip flops 90 and 92 are "set". The reset inputs R of flip flops 90 and 92 are coupled to the output of "and" gate 98 and being further coupled to load input 100 of up/down counter 102. One input 104 of "and" gate 98 is connected to offset preset output 106 of A–D converter 78. A second input 108 is connected to the set output SO of flip flop 92. Inputs 82 and 84 of "or " gates 86 and 88, respectively, are coupled to the output of one shot 114 having an input coupled to the output of "and" gate 116. The set output SO of flip flop 90 is coupled to input 118 of "and" gate 120 and input 122 of "and" gate 124 whereas the reset output RO of flip flop 90 is connected to inputs 126 and 128 of "and" gates 130 and 116, respectively. 500 KHz clock pulses from output 132 of A–D converter 78 are selectively coupled to inputs 134 and 136 of "and" gates 130 and 120, respectively. The outputs of "and" gates 120 and 130 are in turn coupled to count up and count down inputs 138 and 140, respectively, of up/down counter 102. Accordingly, when flip flop 90 is set, counter 102 counts in an "up" direction responsive to clock pulses from the output of "and" gate 120. When flip flop 90 is reset, an output of "and" gate 130, coupled to input 140 of up/down counter 102 enables counter 102 to count "down". The output of "and" gate 124 is coupled as a strobe signal to input 142 of storage register 144 and has second input 146 connected to output 148 of A–D converter 78 which is also connected to input 149 of "and" gate 116. The output of "and" gate 116 in turn is coupled as a strobe to input 150 of storage register 152 and as a trigger input to one shot 114, which as previously stated, has an output coupled to inputs 82 and 84 of "or" gates 86 and 88, respectively. Reset output RO of flip flop 92 is coupled as a trigger input to one shot 154 having an output coupled to input 156 of "and" gate 158. Second input 160 of "and" gate 158 is enabled by register reset output 162 of A–D converter 78. Slope preset output 164 from A–D converter is coupled to input 166 of "and" gate 168, being also enabled at input 170 by register reset output 162 from A–D converter 78. The outputs of "and" gates 158 and 168 are coupled to inputs 172 and 174, respectively, of "or" gate 176, the output of which is coupled to reset input 178 of up/down counter 102. A carry output from the last or most significant stage, not shown, of up/down counter 102 is coupled as an input 180 of A–D converter 78 for a purpose to be further described.

Register 144 typically contains the actual weight of tank 70 during any measurement cycle. As with the system previously described, this system may also be adapted to actually regulate the flow of materials, say for example fuel flow to an engine 182.

Referring to the related waveforms of FIG. 4, one cycle of operation of the system will be described Assuming the weight of tank 70 is to be sampled each 36 seconds, then switch 81 is placed in the position as shown in FIG. 3. Accordingly, at some arbitrary time T0, waveform "A," a negative clock pulse from timing pulse generator 80 is applied to inputs 110 and 112 of "or" gates 86 and 88 and to the set input of flip flop 90. The output of "or" gate 86 triggers one shot 94, a delayed output which results in a digitized command at input 96 of A–D converter 78, waveform "B." After a short delay, at T1, register reset and slope preset pulses occur at outputs 162 and 164 of A–D converter 78, waveforms "C" and "D," which are connected to inputs 170 and 166 of "and" gate 168. A positive pulse at the output of "and" gate 168 is coupled to input 174 of "or" gate 176. The output of "or" gate 176 applies a reset pulse to input 178 of counter 102, waveform "E." Coincident with the trailing edge of this counter reset pulse, clock pulses are fed from output 132 of A–D converter, waveform "F," to inputs 134 and 136 of "and" gates 120 and 130. Clock pulses are now coupled through "and" gate 120 to count "up" input 138 of counter 102, waveform "G." A signal integration interval of 50,000 pulses, at a 500 KHz rate, now occurs within the A–D converter during which period the analog of amplifier 74 from load cell 72 is integrated by A–D converter 78. A train of 50,000 pulses is serially fed into up/down counter 102. upon the completion of the 50,000 pulse interval at T2, a " carry" signal from output 179 of up/down counter 102 is coupled to input 180 of A–D converter 78 which shifts converter 78 into a second or reference integration mode of operation.

A–D converter 78 now outputs register reset and offset preset pulses, waveforms "C" and "H," respectively. Offset preset output 106 is coupled to input 104 of "and" gate 98 being enabled by the set output SO of flip flop 92. Thus, an output of "and" gate 98 resets flip flops 90 and 92. Further, a second output of "and" gate 98, waveform "I," is fed to strobe or latch input 100 of up/down counter 102, to strobe the actual weight of the tank now contained in register 144 from a previous sampling, into up/down counter 102. Since flip flop 90 is now reset, input 126 of "and" gate 130 is enabled, and clock pulses at input 134 are coupled through "and" gate 130 to count down input 140 of up/down counter 102, waveform "J."

Flow rate is now computed by up/down counter 102 wherein the present weight of tank 70 is effectively subtracted from the previously computed weight of tank 70, now contained in counter 102, as follows. During the second, or reference integration period, A–D converter 78 produces a number of clock pulses proportioned to the present weight of tank 70. Since the weight of tank 70 is reduced in accordance with the fuel consumed by engine 82, the number of pulses from A–D converter is also proportionately reduced. Accordingly, upon the termination of the reference integration interval, a number remains in counter 102, which is the flow rate in pounds per hour of fuel consumed.

Upon the termination of the reference integration period, A–D converter 78 outputs a strobe signal, waveform "K," to input 149 of "and" gate 116, now enabled by the reset output of flip flop 90 which couples a strobe signal to strobe input 150 of display register 152, waveform "N." Flow rate is then displayed by display 153. A second output of "and" gate 116 is coupled through one shot 114 to inputs 82 and 84 of "or" gates 86 and 88, waveform "L." The output of "or" gate 88 sets flip flop 90. The output "or" gate 86 triggers one shot 94 which applies an external trigger to A–D converter 78. This external trigger, waveform "B," applied to A–D converter, again initiates the signal integrate period in A–D at time T3, then after a short delay at T4, outputs register reset and slope preset pulses, waveforms "C" and "D."

Since both of these pulses occur simultaneously in "and" gate 168, an output of "and" gate 168 is coupled to input 174 of "or" gate 176, the output of which resets counter 102, waveform "E." Since the output of one shot 114 has again set flip flop 90 through "or" gate 88, counter 102 is now enabled to count up. Accordingly, clock pulses fed through input 136 of "and" gate again step counter 102 up to 50,000 counts, producing a "carry" to input 180 of A-D converter 78. Upon the termination of this count, A-D converter 78 outputs register reset and offset preset at time T5, waveforms "C" and "H." Register reset is coupled through "and" gate 158 and "or" gate 176 to reset counter 102.

Subsequently, a number of clock pulses proportioned to the present weight of tank 70 are coupled through "and" gate 120 into count-up input 138 of counter 102, whereupon the actual weight of tank 70 is stored in up/down counter. A strobe pulse at time T6, waveform "K," from A-D converter is now coupled through "and" gate 124, waveform "P," being enabled by the set output SO of flip flop 90, to transfer and store the number now contained in counter 102, in register 144. This number is the present weight of the tank 70. This last function is performed in preparation for a subsequent sampling cycle.

What is claimed is:

1. A flow measurement system comprising:
    weight measurement means adapted to be coupled to a container from which material is being dispensed and including means for providing a plurality of electrically indicated weight signals at regular, successive, predetermined times;
    analog-to-digital conversion means responsive to said weight signals from said weight measurement means and responsive to first control signals for providing digital weight signals;
    storage means including a digital storage means coupled to the output of said analog-to-digital converter for sequentially storing one said digital weight signal until the receipt of a second digital weight signal;
    subtraction means responsive to a said digital weight signal from said analog-to-digital conversion means, a digital weight signal from said storage means, and a second control signal for providing a difference output representative of difference in weight between successive said digital weight signals;
    first control logic means for providing said first control signals to said analog-to-digital conversion means for providing said digital weight signals at selected intervals of time;
    second control logic means for providing said second control signal to said subtraction means for providing an output representative of difference in weight; and
    transducer means responsive to the output of said subtraction means for providing a discrete output representative of said difference output and thus rate of flow of material.

2. A flow measurement system as set forth in claim 1 wherein said transducer means comprises readout means for indicating the rate of flow of material.

3. A flow measurement system as set forth in claim 1 wherein said transducer means comprises means adapted to be coupled to a flow outlet of said container for regulating flow from a said container at a controlled rate.

4. A flow measurement system as set forth in claim 3 wherein said transducer means further comprises readout means for indicating said rate of flow.

5. A flow measurement system as set forth in claim 1 further comprising weight reference means responsive to the output of said weighing means for selectively providing a zero output of said weighing means for any applied weight to said weighing means, whereby the output of said weighing means thereafter is representative of the total weight reduction sensed by said weighing means.

6. A flow measurement system as set forth in claim 5 further comprising switching means for connecting the output of said analog-to-digital control means to said transducer means and said transducer means comprises means for displaying an output representative of the electrical signal output of said weighing means.

7. A flow measurement system as set forth in claim 1 wherein said system further comprises a buffer storage register and means responsive to said first set of control signals for transferring a digital weight signal to said buffer storage register and means responsive to a third set of control signals for sequentially transferring a digital weight signal stored in said buffer storage register to said storage register means; and
    said control logic means further comprises means for providing said third set of control signals to said buffer storage means and said subtraction means is responsive to the output of said buffer storage register of said analog-to-digital conversion means;
    whereby a digitized weight signal is initially stored in said buffer storage register, then transferred to said storage register means and the next successive digital weight signal from said analog-to-digital converter is transferred to said buffer storage register and then said subtraction means responsive to the thus registered digital weight signals provides said difference output.

8. A flow measurement system as set forth in claim 1 wherein said A-D conversion means comprises means for providing for each said digital weight signal a number of pulses proportional to weight as a mathematical decimal count, and said subtraction means comprises a binary coded decimal up/down counter responsive to one decimal count in said A-D converter representative of a current weight and a second decimally coded count in said storage register means representative of the last previously A-D converted weight signal, for counting between said counts and thereby providing a count representative of said difference in weight; and
    said readout means includes a register for storing the output count from said up/down counter and displaying said count as an observable flow rate output.

* * * * *